No. 852,177. PATENTED APR. 30, 1907.
C. F. GILL.
POULTRY FOUNTAIN.
APPLICATION FILED DEC. 4, 1906.
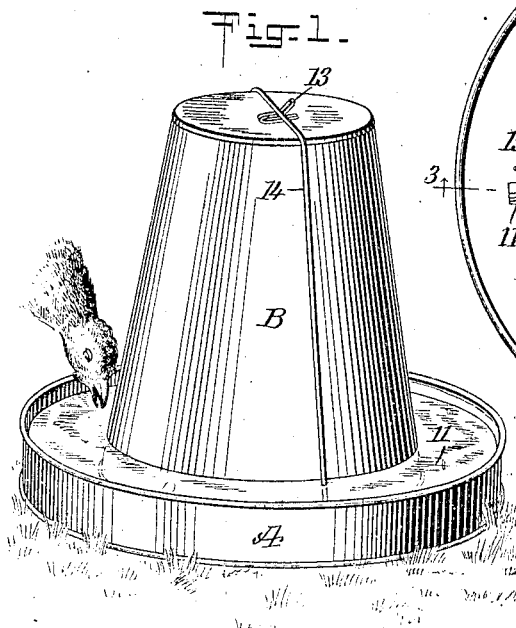
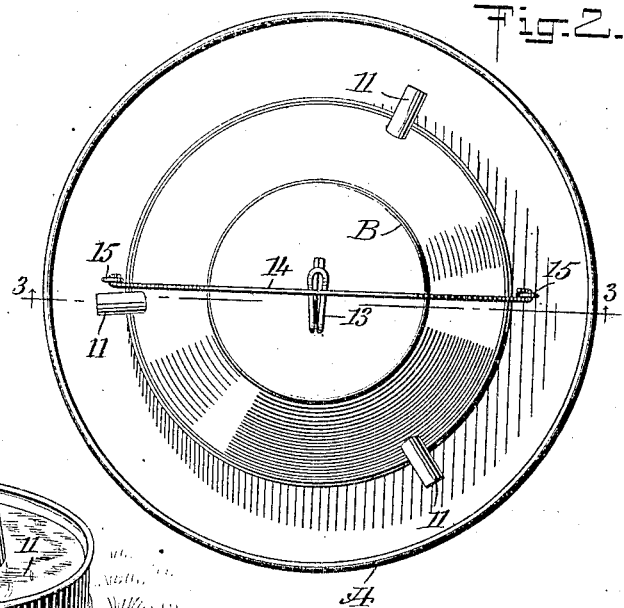
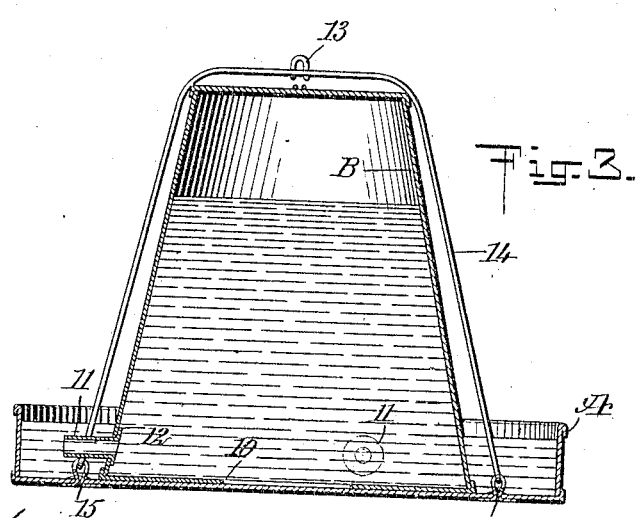
WITNESSES
INVENTOR
Charles F. Gill
BY Munn & Co
ATTORNEYS

UNITED STATES PATENT OFFICE.

CHARLES F. GILL, OF LA HARPE, ILLINOIS.

POULTRY-FOUNTAIN.

No. 852,177.　　　Specification of Letters Patent.　　　Patented April 30, 1907.

Application filed December 4, 1906. Serial No. 346,208.

*To all whom it may concern:*

Be it known that I, CHARLES F. GILL, a citizen of the United States, and a resident of La Harpe, in the county of Hancock and State of Illinois, have invented a new and Improved Poultry-Fountain, of which the following is a full, clear, and exact description.

The purpose of the invention is to provide a drinking fountain for poultry of very simple, durable and economic construction, comprising a tank, a tray and means for holding the tank fast to the tray, yet admitting of a ready separation of said parts, the attaching means also serving as a handle whereby to facilitate the ready removal of the device from place to place.

A further purpose of the invention is to provide a tank with side outlets, thus enabling the bottom of the tank to be in close and uninterrupted engagement with the bottom of the tray.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a perspective view of the device; Fig. 2 is a plan view thereof, drawn upon a larger scale; and Fig. 3 is a vertical section taken practically on the line 3—3 of Fig. 2.

A represents the tray of the device and B the body thereof, which is in the form of a tank. These two parts may be made of any suitable material; preferably, however, they are constructed of sheet metal, and the tank B is given a conical formation, being widest at its base, and the base of the said tank is made to rest upon the bottom of the tray A, having uninterrupted contact therewith.

The bottom or base of the tank B is provided with a central opening 10, through which the tank is filled with water. Any desired number of spouts 11 extend from the inside of the tank out adjacent to its bottom or base as is best shown in Fig. 3, and said spouts 11 are adapted as outlets for the water in the tank; and when the tank is in position in the tray the said spouts 11 occupy a position about midway between the top and the bottom of the tray as is clearly shown in Fig. 3. The spouts 11 may be secured to the tank B in any suitable way. Ordinarily, however, each is provided with a flange 12 at its inner end, said flanges being secured by cement or other means to the inner face of the tank.

A hook 13 is secured to the top central portion of the tank B. This hook is a spring hook and is preferably made of spring wire as is illustrated. The hook 13 is adapted to be engaged by a bail 14 that is of suitable shape to pass over the tank B and engage at its upper bow portion with the hook 13, being sprung over the said hook so as to be in firm frictional engagement therewith, the ends of the bail 14 having hinged connection with eyes 15 secured to the bottom of the tray A.

It will be observed that when the bail has been carried over the tank and forced upon the hook 13, the bottom of the tank will be held in firm engagement with the bottom of the tray.

In operation the tank is separated from the tray and is upturned and filled with water through the opening 10 in its base or bottom; the tray is then placed upon the bottom of the tank while still upturned, and the two parts, the tank and the tray are restored to their proper position for use as shown in the drawing; finally the bail 14 is made to engage with the hook 13.

The water will find its way out from the tank through the nozzles or spouts 11 until the tray is practically filled as is indicated; and as the water is taken or absorbed from the tray around the tank the water from the tank will supply the tray with water until the main source of supply is exhausted.

Having thus described my invention, I claim as new, and desire to secure by Letters Patent,—

1. A poultry fountain consisting of a tray, a tank resting upon the tray, said tank having an inlet in its bottom, and an outlet in the side thereof within the tray, and means for removably holding the tank into engagement with the tray, said means comprising a spring keeper on the top of the tank, and a bail connected with the tray for engaging the keeper.

2. A drinking fountain for poultry, consisting of a tray, a tank closed with the exception of an opening at its base, the base of the tank being in engagement with the upper face of the bottom of the tray, spouts extending out from the sides of said tank into the said tray, a spring keeper secured to the top of the tank, and a bail pivotally attached to the tray and adapted for engagement with the said keeper.

3. A drinking fountain for poultry consisting of a tray, a conical tank the bottom of which rests upon the upper face of the bottom of the tray, the bottom of the tank being provided with an opening therein, said tank being otherwise closed, spouts extending out from the sides of the tank into said tray, occupying a position about midway between the top and the bottom of said tray, a spring hook secured to the top of the tank, and a bail of spring material pivoted to the tray and shaped to conform to the tank, being adapted for engagement with the hook carried by the tank.

In testimony whereof I have signed my name to this specification in the presence of two subscribing witnesses:

CHARLES F. GILL.

Witnesses:
JNO. W. WALKER,
F. A. WILKINSON.